Aug. 29, 1939.   R. S. SANFORD   2,170,875

CLUTCH CONTROL MECHANISM

Original Filed Oct. 5, 1931

INVENTOR
ROY S. SANFORD
BY H. Q. Clayton
ATTORNEY

Patented Aug. 29, 1939

2,170,875

UNITED STATES PATENT OFFICE 2,170,875

CLUTCH CONTROL MECHANISM

Roy S. Sanford, New York, N. Y., assignor to Bendix Aviation Corporation, South Bend, Ind., a corporation of Delaware Original application October 5, 1931, Serial No. 566,884. Divided and this application May 27, 1936, Serial No. 82,095

3 Claims. (Cl. 192—.01)

This invention relates in general to control mechanism for automotive vehicles and particularly to the throttle, brakes and clutch, which mechanisms control the speed of the vehicle.

It is desirable that these controls be so related as to insure maximum efficiency in the operation of the vehicle, and it is to this end that the invention is directed.

Succinctly stated, the invention comprehends a correlated throttle, brake and clutch mechanism whereby the clutch is automatically disengaged by power with the engine idling at closed throttle and automatically engaged as the throttle is opened. The construction is further characterized by means, either manually operated or operated automatically and by power, for disengaging the clutch manually, through the medium of the brake pedal, in the event of the failure of certain power operated means normally operating the clutch.

Other objects of the invention and desirable details of construction and combinations of parts will become apparent from a detailed description of certain embodiments of the invention, described in detail in the following specification taken in conjunction with the accompanying drawing illustrating said embodiments, in which.

Figure 1:
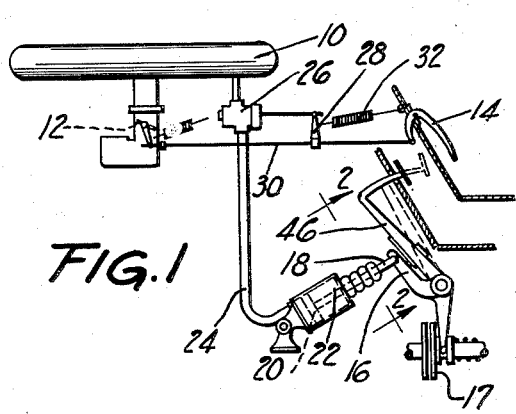
Figure 1 is a diagrammatic view of one embodiment of the throttle, clutch and brake control mechanism constituting the invention.
Figure 4:
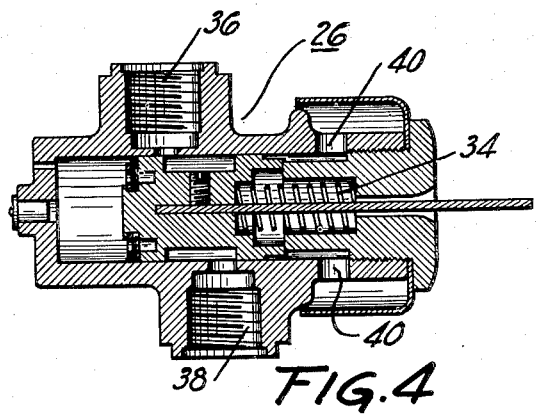
Figure 4 is a longitudinal sectional view of the power clutch control valve of Figure 1.

As illustrated diagrammatically in Figure 1, there is disclosed the conventional internal-combustion engine intake manifold 10 and throttle 12, the latter operated by a spring returned accelerator pedal 14. The conventional clutch 17 is operated by a crank arm 16, the latter positively connected, by a rod 18, with the piston 20 of a cylinder 22, the latter parts constituting a vacuum operated fluid motor for power operation of the clutch. The motor is placed in circuit with the manifold 10 through the medium of conduit 24, a three-way control valve 26 for the motor being interposed in the vacuum connection. The valve is adapted to be opened by virtue of its connection 28 with the accelerator rod 30. With the accelerator released the spring 32 compresses valve spring 34, Figure 4, to intercommunicate the valve ports 36 and 38 to open the valve and evacuate the fluid motor, this by virtue of the vacuum existing in the manifold at closed throttle. The piston 20 is thus moved to the left and the clutch released, preparatory to gear shifting or to free wheel the vehicle, whenever the throttle is closed and is likewise engaged, as the accelerator pedal is depressed to accelerate the engine, by virtue of the expansion of valve spring 34 to register ports 38 and 40, to vent the motor. The valve 26 forms no part of the present invention, inasmuch as the same constitutes the subject matter of Patent No. 2,041,475, issued May 19, 1936.

The aforementioned construction, briefly described, is, in a general way, similar to that of the patent to Belcia 1,470,272, dated October 9, 1923, the present invention constituting an improvement thereover.

Figure 2:
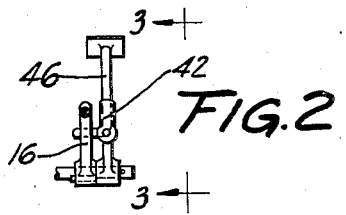
Figure 2 is a view, looking in the direction of the arrows 2—2 of Figure 1, disclosing in detail one form of clutch and brake pedal.
Figure 3:
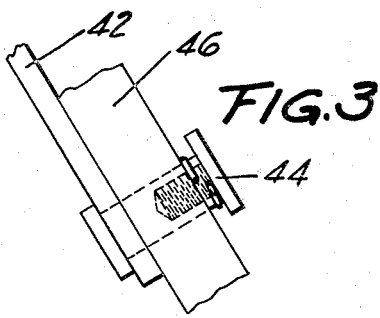
Figure 3 is an enlargement of the emergency connection between the clutch and brake pedals, looking in the direction of the arrows 3—3 of Figure 2.

One important feature of the present invention relates to means for operating the clutch in the event of the failure of the aforementioned vacuum operated power mechanism, and to this end there is suggested the provision of a stop 42, Figure 2, adjustably mounted by spring pressed set screw 44, on the brake pedal 46. Should the clutch power device fail for any reason, the operator merely raises the usual bonnet, not shown, in the floor board and drops the stop 42 into the position shown in dotted lines in Figure 2 in contact with or adapted to contact the clutch operating crank arm 16 as the brake pedal is operated. The clutch is thus manually released through the intermediary of the brake pedal as the brake is applied and usually before the brakes are actually applied, this by virtue of the slack take up in the brake hook-up.

Figure 6:
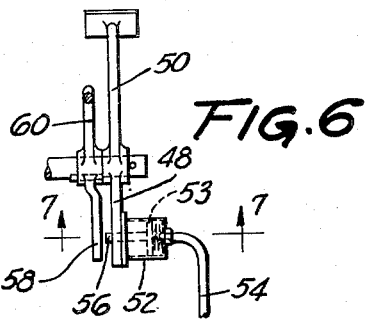
Figure 6 is an enlarged view of the clutch and brake pedal construction of Figure 5, looking in the direction of the arrows 6—6.
Figure 5:
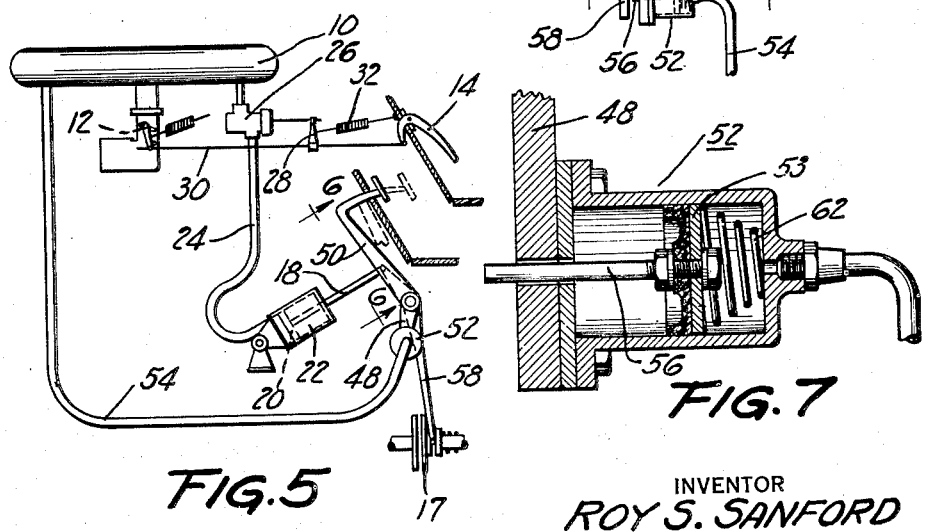
Figure 5 is a view, similar to Figure 1, disclosing a modified form of brake and clutch pedal interconnection.
Figure 7:
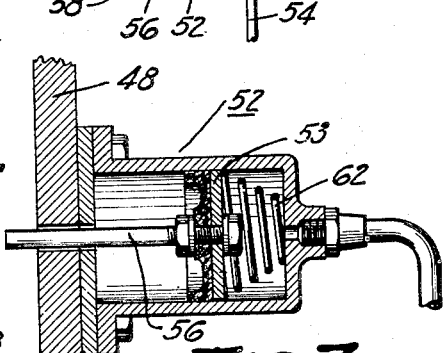
Figure 7 is a longitudinal sectional view, taken on line 7—7 of Figure 6, through the power operated clutch and brake pedal interconnecting device of Figure 6.

There is disclosed in Figures 5, 6 and 7 a power operated stop mechanism provided for the same purpose as that of the stop just described. In this construction there is permanently mounted, on a projection 48 extending from the brake pedal 50, a cylinder 52 housing a piston member 53. The cylinder 52 is in air transmitting connecting with the manifold 10 by means of conduit 54.

The clutch is normally controlled by the aforementioned power device, Figure 1, and the evacuated condition of the manifold also serves to evacuate the cylinder 52 to withdraw the piston 53 with its plunger or stop 56 to the right, Figure 7, and out of contact with the lower arm 58 of the clutch crank 60. However, should the vacuum fail for any reason, the plunger 56 is spring pressed to the left, Figure 7, by spring 62 to contact or be contacted by the clutch crank arm 58. Subsequent manual operation of the brake pedal 50 accordingly serves to disengage the clutch in the manner previously described. The compressed spring 62, by virtue of the potential energy thereof, constitutes a power means automatically operative, in the event of stopping of the engine, to move the stop 56 outwardly and thus insure a disengagement of the clutch when the brake is applied.

This application is a division of my copending application Serial No. 566,884, filed October 5, 1931.

Although this invention has been described in connection with certain specific embodiments, the principles involved are susceptible of numerous other applications that will readily occur to persons skilled in the art. The invention is, therefore, to be limited only as indicated by the scope of the appended claims.

I claim:

1. In a control mechanism for an automotive vehicle provided with brakes and a clutch, manually operated means for applying the brakes, power operated means for operating the clutch, and power operated means automatically operable, in the event of stopping of the engine, for making possible an operation of the clutch by said brake operating means as the brake is applied.

2. In a control mechanism for an automotive vehicle having a throttle, clutch and brakes, manually operated means for applying the brakes, power operated means for disengaging the clutch, and manually operated means for operating the throttle, said latter means having an element in common with said clutch operating means and means, operable in conjunction with said power means, for making possible an operation of the clutch by the manually operated means for applying the brakes, said latter conjoint operation of the clutch and brakes being effected in the event of stopping of the engine.

3. In an automotive vehicle provided with brakes, a clutch and an internal-combustion engine, the latter provided with an intake manifold, means for operating the brakes, power means for operating the clutch, other power means mounted on said first-mentioned means, said latter power means comprising a spring pressed plunger member operable, in the event of stopping of the engines, to contact said first-mentioned means to make possible a concurrent operation of the clutch and brakes by said first-mentioned means.

ROY S. SANFORD.